(12) United States Patent
Monagle et al.

(10) Patent No.: US 6,797,288 B2
(45) Date of Patent: Sep. 28, 2004

(54) GELLING VEGETABLE PROTEIN

(75) Inventors: Charles W. Monagle, Fort Wayne, IN (US); Helge S. Pedersen, Viby (DK); Carmen M. Darland, Fort Wayne, IN (US); Navpreet Singh, Fort Wayne, IN (US)

(73) Assignee: Solae, LLC, St Louis, MO (US)

( * ) Notice: Subject to any disclaimer, the term of this patent is extended or adjusted under 35 U.S.C. 154(b) by 0 days.

(21) Appl. No.: 10/050,432

(22) Filed: Jan. 15, 2002

(65) Prior Publication Data

US 2003/0045689 A1 Mar. 6, 2003

Related U.S. Application Data

(60) Provisional application No. 60/262,891, filed on Jan. 16, 2001.

(51) Int. Cl.$^7$ .......................... A61K 35/78; A23L 1/052
(52) U.S. Cl. ....................... 424/757; 426/573; 426/574; 426/634
(58) Field of Search .......................... 424/757; 426/573, 426/574, 634

(56) References Cited

U.S. PATENT DOCUMENTS

| | | |
|---|---|---|
| 3,897,574 A | 7/1975 | Pass |
| 4,234,620 A | 11/1980 | Howard et al. |
| 4,322,344 A * | 3/1982 | Chen et al. |
| 4,346,122 A | 8/1982 | Orthoefer et al. |
| 4,410,554 A | 10/1983 | Sailer |
| 4,435,438 A | 3/1984 | Lehnhardt et al. |
| 4,704,289 A | 11/1987 | Scheide et al. |
| 5,097,017 A | 3/1992 | Konwinski |
| 6,355,295 B1 * | 3/2002 | Altemueller et al. |

OTHER PUBLICATIONS

Copy of International Search Report mailed Oct. 28, 2002.
XP002216592—"Food Chemistry", Belitz, H–D and Grosch, W: 1999, p. 711, last paragraph, p. 712, last paragraph; figure 16.8.

* cited by examiner

*Primary Examiner*—Susan D. Coe
(74) *Attorney, Agent, or Firm*—James L. Cordek

(57) ABSTRACT

A process to obtain a highly soluble, low viscosity, salt tolerant gelling vegetable protein product. When introduced into a suitable meat injection brine, the protein product is capable of forming a firm sliceable meat piece with high water retention and no visible signs of the injected brine. When included in gel-based food products such as meat analog formulas, the protein product is capable of forming the desired gel structure, such as firm, sliceable meat-like pieces.

8 Claims, No Drawings

GELLING VEGETABLE PROTEIN

CROSS-REFERENCE TO RELATED APPLICATION

This application is related to and claims the benefit under 35 U.S.C. §119(e) of U.S. Provisional Patent Application Ser. No. 60/262,891, entitled GELATING VEGETABLE PROTEIN, filed Jan. 16, 2001.

BACKGROUND OF THE INVENTION

1. Technical Field

The present invention relates a highly soluble gelling vegetable protein product, and to a process for obtaining such product.

2. Background of the Invention

Meat injection is widely used in the food industry in order to increase the juiciness and tenderness of the meat, as well as to increase the yield thereof. Typical injection brines consist of nitrite salt, dextrose, phosphate, ascorbic acid, and a protein source such as soy protein. In order to obtain the desired product quality, the brine must disperse rapidly within the muscle fibers and support or strengthen the meat protein gel formed under the processing conditions. In addition, the injected brine should also be retained within the muscle fibers.

Typical protein sources are viscous and only partly soluble. These sources often have a somewhat impaired dispersion ability due to insoluble particles and high brine viscosity. Also, the amount of protein product which can be included in a brine formulation is limited by the degree of viscosity imparted. Further, gelling is typically not complete at the relatively low temperatures typically used for meat pasteurization, and the strength of the gel is diminished in salt.

There is a need for a brine containing an improved protein source, which allows for good dispersibility, gel formation at low temperatures, good binding properties for the brine and the ability to be included at high levels in the brine formulation. Some attempts have been made to arrive at such a product based on soy protein.

Vegetable protein based meat analog products or gelling food products, for example cheese and yogurt, offer many health benefits to consumers. Consumer acceptance of these products is directly related to organoleptic qualities such as texture, flavor, mouthfeel and appearance. Protein sources for gel-based food products such as meat analogs, like those useful in pickling brines, must have good gel forming properties at relatively low cooking temperatures and good water and fat binding properties. Typically, vegetable proteins and combinations of vegetable proteins such as vital wheat gluten and soy protein isolate will form viscous mixes, prior to cooking, which are difficult to handle in pumping and forming equipment. Also, the cooked products from these protein sources are typically significantly different in chewiness or "bite" from the natural texture of processed meat products or gelled food products. There is a need for vegetable protein sources which will support improved handling properties of mixtures before cooking and improved texture of cooked products.

U.S. Pat. No. 5,663,058 discloses a process for producing a soybean protein material comprising the steps of hydrolyzing soybean protein, emulsifying an oil-and-fat ingredient with the soybean protein and drying the mixture. The product is said to have taste, color and water-dispersibility suitable for use as a pickling solution at high concentrations and in viscous liquid foods such as soup.

SUMMARY OF THE INVENTION

The present invention relates to a process to obtain a highly soluble, salt tolerant, low viscosity, gelling vegetable protein product. When introduced into a suitable meat injection brine, the protein product is capable of forming a firm sliceable meat piece with high water retention, having no visible signs of the injected brine. When included in suitable vegetable protein-based formulations which simulate cooked processed meat products or gelled food products, the protein product is capable of forming firm, sliceable pieces or the typical gel character of the food product. The invention is illustrated by the preparation of a soy protein powder.

The present invention provides a protein source for meat injection, which has not been hydrolyzed, and is characterized by a very high dispersibility and solubility and low viscosity, which enables the product to readily distribute itself in between the meat fibers in the injected meat piece.

More specifically, the present invention discloses a native vegetable protein product, which is highly soluble in water, low in viscosity, and forms a gel at mild heat treatment. The product forms a gel at a temperature of between 60 and 105° C., preferably at a temperature of between 70 and 90° C.

The product is further characterized in that it has a protein content between 60% and 82% moisture free basis, and an NSI (nitrogen solubility index) of between 50 and 100. The product is further characterized by having a viscosity of 5–50 centipoises, preferably 5–25 centipoises, measured on a 10% dispersion by weight, in water. In addition, the product may contain a high amount of soluble sugars. As a preferred protein, soy protein is used.

A process is disclosed for obtaining the native protein product, including the steps of:

dispersing purified protein with high PDI (protein dispersability index) in water around neutral pH;

extracting the dispersion;

centrifuging the dispersion to remove the insoluble fraction;

optionally lowering the pH of the supernatant fraction to 5.0;

neutralizing;

optionally removing low molecular weight solubles by ultra filtration;

treating the product, optionally in a jet cooker;

cooling; and spray drying.

Further, a meat injection brine is disclosed, including as one of the ingredients the native protein material treated according to the indicated process. As an example, soy protein material is used. Also disclosed is a meat preparation injected with the soy protein material.

The invention further discloses meat analog products including, as one of the ingredients, the native protein material treated according to the indicated process. As an example, soy protein material is used.

DETAILED DESCRIPTION

A process for the purification and treatment of vegetable protein is disclosed. The process results in a protein with low viscosity and good dispersibility in pickling brines and in meat after injection and which easily forms a gel under normal meat processing conditions which is not diminished in strength in the presence of salt. At the same time, the water holding properties of the product are favorable. The meat product resulting after the injection with a brine containing the treated vegetable protein is a firm sliceable meat piece with high water retention and no visible signs of the injected brine.

The present invention also discloses a process for the purification and treatment of soy protein, resulting in a protein product with good dispersability and low viscosity which, when included in meat analog mixes or gelling food product formulations, has good handling properties and easily forms a salt tolerant gel under normal cooking conditions to make firm, sliceable pieces with a high resemblance to processed meat products.

The protein product obtainable by the process disclosed herein is a native vegetable protein product, which is highly soluble in water and forms a gel with mild heat treatment. Specifically, the product forms a gel at a temperature of between 60 and 105° C., preferably at a temperature of between 70 and 90° C. The product is further characterized in that it has a protein content of between 60 to 82% protein, moisture free basis, and an NSI (nitrogen solubility index) of between 50 and 100. In addition it may contain a high amount of soluble sugars.

The native protein product is obtained through the steps of:

dispersing the protein with high PDI in water around neutral pH;

extracting the dispersion;

removing the insoluble fraction;

optionally lowering the pH of the supernatant fraction to 5.0;

neutralizing;

optionally removing low molecular weigh solubles by ultra filtration;

treating the product, optionally in a jet cooker;

cooling; and spray drying.

Every single step is performed with a certain objective, and therefore the equipment used is not critical as long as the product of each step or of all the steps taken together falls within the defined scope. The present process also works with proteins obtainable from various vegetables, however, soy protein is used herein as an example.

The above-mentioned process is described in general terms. Similar results are obtained through the following modifications of the indicated process.

The starting material is taken in the present examples as a soy protein, specifically in the form of soy flakes. More generally any vegetable protein product obtained in a similar way, having a high PDI gives the same or similar results. The flakes are obtained as follows. Whole, cleaned soy beans are tempered and cracked prior to removing the hulls through air suction. The resulting soy chips are further flaked by passing a set of rolls, oil is removed by hexane extraction. The excess hexane is removed through steam desolventizing resulting in soy white flakes, which are used as raw materials for the present process. The white flakes are then dispersed and extracted in water as follows.

The solids content during the initial water extraction may be varied from 5% (w/w) to 15% (w/w). Preferably, the content is about 12% (w/w). In general, the limits to the content are determined by the efficiency of the process, wherein the content should not be too low as this would require unwanted and unneeded process fluid volumes. The upper limit is determined by the viscosity, which should not be too high as this makes the material difficult to handle and impairs separation efficiency.

Extraction conditions depend on the extractor which is used, and may be varied between a temperature of 2° C. for 120 min to 85° C. for 10 min. The objective always being to extract the maximal amount of protein.

pH lowering may be omitted, depending on the wanted gel strength of the resulting protein product. Lowering the pH below neutral with subsequent neutralization will generate a protein product of higher gel strength.

pH adjustments may be carried out by all known means, i.e., both organic and inorganic acids or bases may be used, provided they are compatible with the use of the desired final product. Removal of the insoluble fraction is performed by any suitable removal process such as sedimentation, decanting, centrifugation, or filtration; however, centrifugation is preferred for its easy adaptation to a continuous process.

Jet cooking conditions may be varied in the range from 100° C. for 2 minutes to 150° C. for 1 sec. (see the Examples below). Jet cooking may be replaced by any other suitable heat treatment process which is capable of achieving a temperature of 100–150° C. in a time frame of 1–120 sec. The cooling step is important, in that it provides a means for controlling the degree of heat treatment of the protein product, which should not be excessive. Flash cooling is a preferred process, although it may be replaced by any other suitable cooling process which is capable of reducing the temperature to about 60° C. in less than 60 sec.

Drying may be carried out by any other process which is capable of rapidly drying the product to product temperatures below 80° C.

The best mode for practicing the present invention known at the filing date of the patent is as follows.

Soy white flakes with high PDI (85% or higher) are dispersed in water with a solids content of approximately 12% (w/w) at around neutral pH (7.0–7.7) and extracted for approximately 30 min. at 30° C. Thereafter, the dispersion is centrifuged in order to remove the insoluble fraction, leaving only 0.5% sedimentable material in the supernatant fraction. Subsequently, the pH is lowered to 5.0 for 10 min with HCl and neutralized again with NaOH. The supernatant is further heat treated in a jet cooker at 140° C. for 3 sec. before being flash cooled to 60° C. The resulting product is spray dried.

The meat brine containing the protein product may contain the following composition:

| | |
|---|---|
| Water | 80% |
| Nitrate salt (0.6% NaNO$_2$) | 6% |
| Dextrose | 4% |
| Potato starch | 3% |
| Protein product | 3% |
| Carrageenan | 2% |
| Phosphate | 1% |
| Ascorbate | 0.1% |

The brine is prepared by dissolving the phosphate completely in the water before adding the other ingredients. The injection process is carried out by using an injector which is capable of injecting and distributing the brine evenly in the meat piece. The brine temperature should be kept at 7–8° C. after mixing.

The meat pieces may further be tenderized in order to increase surface area. The injected meat pieces should be stuffed into casings and cooked for approximately 3 hours to a core temp. of approximately 70° C.

The injected meat piece obtained by utilizing the present protein product in a brine displays very uniform surface structure with no signs of brine pockets or streaks of protein in between the meat fibers. Also, the texture is firm and sliceable as expected from a meat piece. The overall brine pick-up is increased by 15% compared with typically used protein-based brines.

The product obtained is characterized by a very high dispersibility and solubility which enables the product to readily distribute itself in between the meat fibers in the injected meat piece, thereby avoiding pockets of gelatinized brine in between the meat fibers and formation of brownish streaks of deposited protein. Also, the gelling of the product is characterized by a low temperature onset and complete gel formation at temperatures relevant for meat pasteurization, which generates a very firm and cohesive overall meat structure, excellently suited for slicing. The protein gel efficiently binds water and thereby increases the pick-up yield during injection.

It was observed in the Examples described below that the gel strength of the product is increased in the presence of salt, which is a common ingredient in processed meat products and in meat analogs.

The present invention is outlined in the following examples, which are only an illustration and which are in no way meant to limit the scope of the invention.

EXAMPLES

Soy white flakes with high PDI (85% or higher) are dispersed in water with a solids content of approximately 12% (w/w) at around neutral pH (7.0–7.7) and extracted for app. 30 min. at 30° C. Thereafter, the dispersion is centrifuged in order to remove the insoluble fraction, leaving only 0.5% sedimentable material in the supernatant fraction. Subsequently, the pH is lowered to 5.0 for 10 min. with HCl and neutralized again with NaOH. The supernatant is further heat treated in a jet cooker at 140° C. for 3 sec. before being flash cooled to 60° C. The resulting product is spray dried.

Example 1

15.5 kg Cargill soy flour 90/100 is dispersed in 104.5 kg water at 30° C., and the pH is adjusted to 7.4 with NaOH, followed by stirring for 30 minutes. The suspension is then centrifuged in a decanting centrifuge at 6000 rpm and a differential screw speed of 10. The curd fraction is discarded and the pH of the supernatant lowered to pH 5.0 with HCl and left with stirring for 10 min. Thereafter, the suspension is neutralized to pH 7.4 with NaOH and the suspension is heat treated by passing through a jet cooker at 140° C. with a holding time of 3 sec. before being flash cooled to 60° C. The suspension is finally spray dried.

Product Characteristics:

The product obtained in Example 1 had a protein content of 62.0%, a NSI of 89.9%, and a soluble sugar content of 16.1%.

Example 2

15.5 kg Cargill soy flour 90/100 is dispersed in 104.5 kg water at 30° C. and the pH is adjusted to 7.4 with NaOH, followed by stirring for 30 minutes. The suspension is then centrifuged in a decanting centrifuge at 6000 rpm and a differential screw speed of 10. The curd fraction is discarded. Thereafter, the suspension is heat treated by passing through a jet cooker at 100° C. with a holding time of 60 sec. before being flash cooled to 60° C. The suspension is finally spray dried.

Product Characteristics:

The product obtained in Example 2 had a protein content of 64.2%, a NSI of 96.0%, and a soluble sugar content of 16.1%.

Example 3

22.7 kg of soy flour having a protein dispersibility index (PDI) of 86 was dispersed in 235.4 of water at 60° C. and the pH was adjusted to 7.5 using sodium hydroxide. The suspension was mixed for 30 minutes at 60° C., and then centrifuged in a decanting centrifuge. The insoluble centrifuge cake was discarded, and the supernatant was heat treated by passing through a jet cooker at 121° C. with a holding time of 15 seconds. The suspension was then cooled to 48.9° C. in a jacketed vessel, and the pH was adjusted to 7.0 using hydrochloric acid. The suspension was then ultrafiltered using a 10,000 molecular weight cutoff (MWCO) spiral wound membrane to remove about 75% of the feed volume as permeate. The retentate from the membrane was heat treated by passing through a jet cooker at 93.3° C. with a holding time of 15 seconds. The retentate was then cooled to 60° C. in a jacketed vessel and spray dried.

The retentate had the following composition:

| Protein (dry basis) (%) | 79.79 |
| Moisture (%) | 1.23 |
| Ash (as is) (%) | 6.87 |
| Crude fiber (as is) (%) | 0.8 |
| Nitrogen Solubility Index (NSI) | 96.99 |

Example 4

The use of the products of Examples 1 and 2 in meat brine and resulting determination of the meat characteristics.

Lean ham muscle is injected with the below listed brine in order to increase juiciness and yield, and to improve sliceability.

The meat brine containing the protein product of Examples 1 and 2 includes the following composition:

| Water | 80.56% |
| Nitrate salt (0.6% NaNO$_2$) | 6.32% |
| Dextrose | 4.00% |
| Potato starch | 3.41% |
| Protein product of Example 1 or 2 | 2.67% |
| Carrageenan | 1.6% |
| Phosphate | 1.31% |
| Ascorbate | 0.13% |

The meat brine is prepared by dissolving the phosphate completely in the water before adding the other ingredients.

The injection process is carried out by using a Fomaco Injecter at 1.6 bar injection pressure (first pass), and 1.2 bar (second pass) with 12×2 needles with two holes each. The brine temperature is kept at 7–8° C. after mixing. (10% ice of water amount). After the first pass, the meat pieces are passed through a tenderizer with roller knives in order to increase surface area. Total brine pick-up should be 60% of ham weight. The injected meat pieces are stuffed into Perflex Cook Type tight CKT 185 mm diameter casings and cooked for 3 hours and 13 minutes at 78° C. to core temp of 67° C.

Final cooling is via a water shower at 2 hours and 30 minutes with 10–14° C. cold water.

The resulting meat piece had, after slicing, a dry surface, and was very cohesive and had a firm bite. No stripes of injected brine were visible.

Compared with a brine made with a typically used soy protein isolate and processed as mentioned above, the overall yield was superior, in that the resulting product yield after 60% injection, tumbling and cooling was 52% for the protein product of Example 1, 48% for the protein product of Example 2 and 35% for the isolate.

Example 5

The product from Example 3 was used to make vegetarian meat analogs with 0.5% fat and 3.0% fat.

| Formula | % | % |
|---|---|---|
| Water | 62.34 | 63.34 |
| Protein product from Example 3 | 17 | 17 |
| Vital Wheat Gluten[1] | 10 | 5 |
| Inulin | 2 | 4 |
| Sugar | 2 | 2 |
| Salt | 1.91 | 1.91 |
| Methylcellulose[2] | 1.5 | 1.0 |
| Beef Flavor 535557[3] | 1.25 | 1.25 |
| Crusty Fatty Pork Flavor 535087[3] | 1.25 | 1.25 |
| Vegetable oil | 0.5 | 3 |
| Hot Dog Flavor[3] | 0.25 | 0.2 |

[1]Midwest Grain Products, Inc.
[2]Dow Chemical Company
[3]Givaudan Roure

A pregel was formed by mixing all of the inulin (18.1 g) with 420.5 g of water. The other ingredients, except oil, were then mixed with the remaining water at 0° C. under vacuum in a Stephan cutter mixer, Model UMC 5 Electronic at 2400 rpm for 90 seconds. The inulin premix and oil were then added, followed by an additional 90 seconds of mixing. The mix was filled into frankfurter casing, linked, then dipped into liquid smoke type P24 which was mixed with 1 part smoke to 10 parts water. The mix was then heat processed in an ALKAR smokehouse according to the following schedule: 8 min. with dry bulb 73.9° C., wet bulb 55.5° C.; 10 min. with dry bulb 82.2° C., wet bulb 70.6° C.; 10 min. with dry bulb 87.8° C., wet bulb 82.2° C.; 11 min. with dry bulb 93.3° C., wet bulb 93.3° C. to internal temperature of 87.8° C.; cold shower 30 min. with dry bulb 68.3° C., wet bulb 51.2° C.

The precook mixture which used the protein product described in Example 3 had a semi fluid consistency which mixed easily, was pumpable and was easily filled into frankfurter casings. The precook mixture which used soy protein isolate was highly viscous and was difficult to fill into frankfurter casings. The resulting products made using the protein product of Example 3 had a firm but resilient texture and mouthfeel and flavor which closely resembled traditional frankfurters. Products made using soy protein isolate were firm but lacked the resilient mouthfeel and texture of traditional frankfurters.

Example 6

Gelation of the protein product was determined. Low temperature gelation was demonstrated in the following experiment.

30 g of the protein product of Example 1 and Example 2 and 22 g of the product from Example 3 were dispersed in 120 mL portions of water in 400 ml beakers. The dispersions were made to be approximately equal in protein content. 5 drops of antifoam was added and the solution mixed at low speed for 30 sec. The solution were filled in two 50 mL centrifuge tubes and centrifuged at 1000 rpm for about 10 sec. to remove entrapped air. The centrifuge tubes were placed in a 70° C. and a 90° C. water bath for 35 min., and subsequently cooled overnight in a refrigerator.

The resulting gels were judged after removal from the centrifuge tubes as very elastic, firm, cohesive and glossy in appearance. The gel treated at 90° C. was slightly more firm compared with the gel at 70° C. The gels made from product of Example 1 were slightly more firm compared with gels made from product of Example 2.

Example 7

The effect of salt on gelation was determined by the following experiment. 23.5 g of the product from Example 3, commercial soy protein isolate, SUPRO 500E (Protein Technologies, Inc.) and commercial soy protein isolate PROFAM 977 (Archer Daniels Midland, Inc) were weighed into 123.5 g portions of water or sodium chloride solutions containing 0.5 M, 0.8 M or 1.0 M sodium chloride. 5 drops of antifoam were added and the dispersions were blended with a hand held laboratory blender for thirty seconds. The dispersions were filled into two, 50 ml centrifuge tubes each and centrifuged at 1000 rpm for about 10 sec to remove entrapped air. The centrifuge tubes were placed in a 90° C. water bath for 35 min followed by cooling overnight in a refrigerator. The resulting gels were scored for the following attributes using a 1 to 5 range where 1 denoted not gel-like and 5 denoted strongly gel-like. The attributes were average gel score, gel strength, shakiness, retain shape of container, sliceability, syneresis, translucence, glossiness and texture.

Gels made using product from Example 3 made firm, resilient gels which increased in strength as salt increased. Gels from both soy protein isolates were firm when no salt was present but were weakened or destroyed in the presence of salt.

| Test Product | % NaCl in solution | Average gel score | Gel Strength | Shakiness | Retains container shape | Sliceability | Syneresis | Translucence |
|---|---|---|---|---|---|---|---|---|
| Run 1 | | | | | | | | |
| Product from Example 3 | 0 | 4.3 | 3.5 | 5.0 | 5.0 | 4.0 | 5.0 | 3.0 |
| Product from Example 3 | 0.59 | 4.3 | 4.0 | 5.0 | 5.0 | 4.0 | 5.0 | 3.0 |

-continued

| Test Product | % NaCl in solution | Average gel score | Gel Strength | Shakiness | Retains container shape | Sliceability | Syneresis | Translucence |
|---|---|---|---|---|---|---|---|---|
| Product from Example 3 | 1.17 | 4.6 | 4.5 | 5.0 | 5.0 | 4.8 | 5.0 | 3.5 |
| Product from Example 3 | 1.77 | 4.5 | 4.7 | 5.0 | 5.0 | 4.8 | 5.0 | 3.5 |
| Product from Example 3 | 2.36 | 4.6 | 4.8 | 5.0 | 5.0 | 4.8 | 5.0 | 4.8 |
| Run 2 | | | | | | | | |
| Product from Example 3 | 0 | 4.3 | 4.0 | 4.5 | 5.0 | 4.0 | 5.0 | 4.0 |
| Product from Example 3 | 2.95 | 4.4 | 4.5 | 4.5 | 5.0 | 4.5 | 5.0 | 3.8 |
| Product from Example 3 | 4.72 | 4.4 | 4.7 | 4.8 | 5.0 | 4.7 | 5.0 | 3.0 |
| Product from Example 3 | 5.85 | 4.5 | 4.9 | 4.5 | 5.0 | 4.8 | 5.0 | 3.5 |
| Soy protein isolate 1 | 0 | 4.0 | 5.0 | 4.8 | 5.0 | 5.0 | 5.0 | 1.0 |
| Soy protein isolate 1 | 1.77 | paste | NS* | NS* | NS* | NS* | NS* | NS* |
| Soy protein isolate 1 | 2.95 | paste separated | NS* | NS* | NS* | NS* | NS* | NS* |
| Soy protein isolate 1 | 4.72 | paste separated | NS* | NS* | NS* | NS* | NS* | NS* |
| Soy protein isolate 1 | 5.85 | paste | NS* | NS* | NS* | NS* | NS* | NS* |
| Soy protein isolate 2 | 0 | 4.0 | 5.0 | 2.0 | 5.0 | 5.0 | 5.0 | 3.0 |
| Soy protein isolate 2 | 1.77 | 3.3 | 4.5 | 1.0 | 5.0 | 5.0 | 5.0 | 3.0 |
| Soy protein isolate 2 | 2.95 | 3.2 | 4.0 | 1.0 | 5.0 | 4.8 | 5.0 | 1.0 |
| Soy protein isolate 2 | 4.72 | 3.2 | 3.8 | 1.0 | 5.0 | 5.0 | 5.0 | 1.0 |
| Soy protein isolate 2 | 5.85 | paste | NS* | NS* | NS* | NS* | NS* | NS* |

NS* = no gel character, not scored
soy protein isolate 1 was SUPRO 500 E (Protein Technolgies, Inc)
soy protein isolate 2 was PROFAM 977 (Archer Daniels Midland, Inc)

What is claimed is:

1. A soy protein product, comprising:
   a protein content of from about 60.0 wt. % to about 85.0 wt. %, of total dry matter;
   a Nitrogen Solubility Index ("NSI") of between about 50 and about 100; and
   a soluble sugar content of between about 6.0 wt. % and about 20.0 wt. % of total dry matter;
   said soy protein product forming a gel in the presence of water when treated with heat at a temperature of between about 60° C. and about 100° C., the integrity of the gel not diminished in the presence of salt.

2. The soy protein product of claim 1, wherein said protein content is from about 65.0 wt. % to about 82.0 wt. % of total dry matter.

3. The soy protein product of claim 1, wherein a dispersion of said soy protein product in water at an amount of about 10.0 wt. % solids has a viscosity of less than about 50.0 centipoise.

4. The soy protein product of claim 1, wherein a dispersion of said soy protein product in water at an amount of about 10.0 wt. % solids has a viscosity of less than about 30.0 centipoise.

5. The soy protein product of claim 1, wherein said soy protein product forms a gel in the presence of water when treated with heat at a temperature of between bout 70° C. and 90° C., the integrity of the gel not diminished in the presence of salt.

6. A meat injection brine, including the soy protein product of claim 1.

7. A meat product, including the soy protein product of claim 1.

8. A meat analog product, including the soy protein product of claim 1.

* * * * *